United States Patent
Lin

(10) Patent No.: US 9,358,640 B2
(45) Date of Patent: Jun. 7, 2016

(54) LASER CUTTING DEVICE AND LASER CUTTING METHOD

(71) Applicant: HON HAI PRECISION INDUSTRY CO., LTD., New Taipei (TW)

(72) Inventor: Chen-Han Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 290 days.

(21) Appl. No.: 14/066,713

(22) Filed: Oct. 30, 2013

(65) Prior Publication Data

US 2014/0353297 A1    Dec. 4, 2014

(30) Foreign Application Priority Data

May 28, 2013  (TW) ............................. 102118865 A

(51) Int. Cl.
  *B23K 26/00*  (2014.01)
  *B23K 26/06*  (2014.01)
  *B23K 26/38*  (2014.01)
  *B23K 26/08*  (2014.01)

(52) U.S. Cl.
  CPC ............ *B23K 26/38* (2013.01); *B23K 26/0876* (2013.01); *B23K 26/361* (2015.10)

(58) Field of Classification Search
  CPC ............ B23K 26/08–26/0815; B23K 26/0876; B23K 26/36–26/365; B23K 26/38–26/381

USPC .......................................... 219/121.6–121.83
See application file for complete search history.

(56) References Cited

U.S. PATENT DOCUMENTS

| | | | | |
|---|---|---|---|---|
| 4,392,476 A | * | 7/1983 | Gresser et al. | 125/30.01 |
| 4,564,739 A | * | 1/1986 | Mattelin | 219/121.68 |
| 5,214,261 A | * | 5/1993 | Zappella | 219/121.67 |
| 5,302,798 A | * | 4/1994 | Inagawa et al. | 219/121.7 |
| 6,034,349 A | * | 3/2000 | Ota | 219/121.73 |
| 6,140,602 A | * | 10/2000 | Costin | 219/121.69 |

* cited by examiner

*Primary Examiner* — Sang Y Paik
(74) *Attorney, Agent, or Firm* — Novak Druce Connolly Bove + Quigg LLP

(57) ABSTRACT

A laser cutting device for cutting an original product includes a laser device which is movable along a first direction and a second direction perpendicular to the first direction, and rotatable reflecting mirrors. The original product includes a stub bar, optical lenses, and connection portions corresponding to the optical lenses. The rotatable reflecting mirrors correspond to the connection portions and are positioned above the original product and aligned with the connection portions. At least two rotatable reflecting mirrors are arranged in a straight line. The laser device is located on the straight line and is configured for emitting laser beams. Each of the rotatable reflecting mirrors is configured for reflecting laser beams from the laser device toward the corresponding connection portion and is configured for rotating so as to allow the laser beams from the laser device to reach the next rotatable reflecting mirror on the straight line.

6 Claims, 4 Drawing Sheets

LASER CUTTING DEVICE AND LASER CUTTING METHOD

BACKGROUND

1. Technical Field

The present disclosure relates to cutting technologies, and particularly relates to a laser cutting device and a laser cutting method.

2. Description of Related Art

Optical lenses used in lens modules are easily manufactured using an injection molding die. During the manufacturing of an optical lens, an original product, which includes a stub bar and a number of optical lenses, are first molded using the injection molding die. Then, the original product is cut to separate the optical lenses from the stub bar using a cutter, such as a trimming pliers or a scissor. However, the mechanical cutting between the cutter and the original product often produces internal stresses. The optical lenses may have cracks if the internal stresses extend to the optical lenses. Furthermore, the cutter becomes dull after a long time use, burrs are easily formed at the edges of the optical lenses.

Therefore, it is desirable to provide a laser cutting device and a laser cutting method using the laser cutting device, to overcome or at least alleviate the above-mentioned problems.

DETAILED DESCRIPTION

Figure 1:
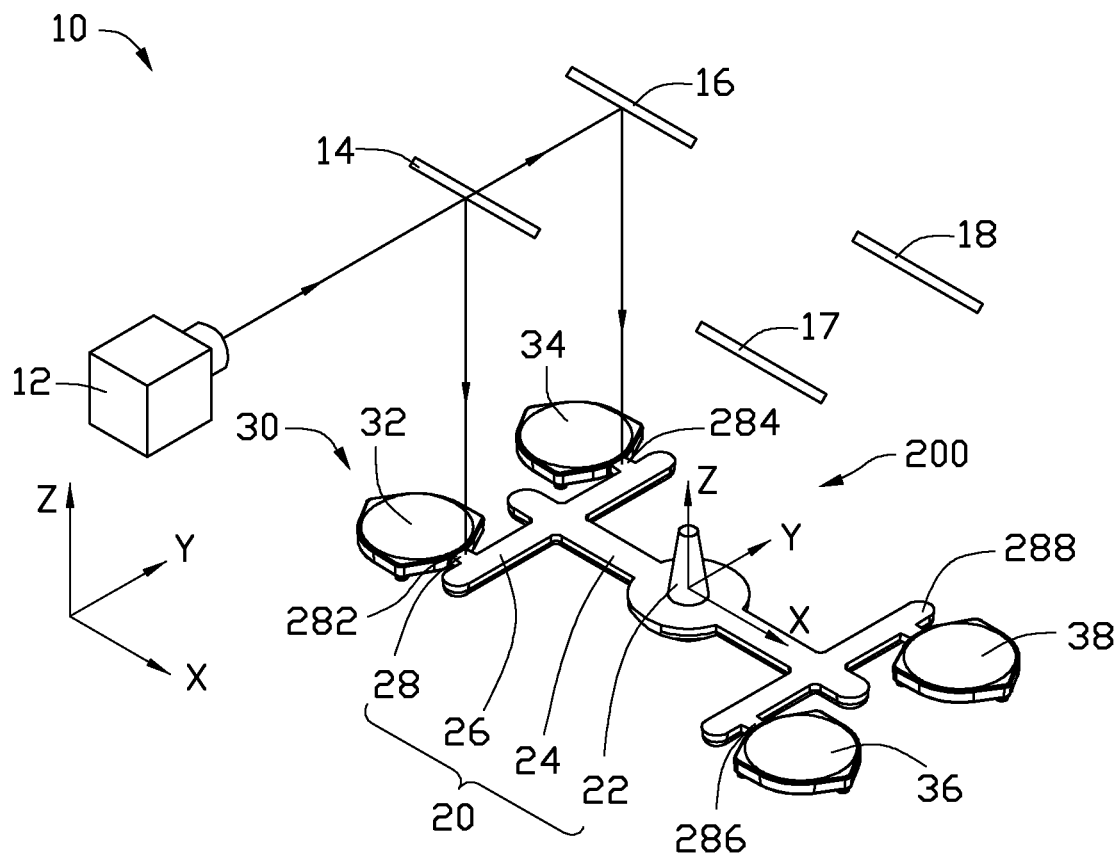
FIG. 1 is a schematic, isometric view of a laser cutting device, according to a first exemplary embodiment.

FIG. 1 shows a laser cutting device 10, according to a first exemplary embodiment. The laser cutting device 10 is configured for cutting an original product 200. In this embodiment, the original product 200 includes a stub bar 20 and four optical lenses 30.

The stub bar 20 includes a pole 22, two main branches 24, four sub-branches 26, and four connection portions 28. The two main branches 24 extend from one end of the pole 22. The two main branches 24 are located at opposite sides of the pole 22, and are symmetrical around the pole 22. Two of the four sub-branches 26 extend from one of the main branches 24, and are symmetrical around the main branches 24. The other two of the four sub-branches 26 extend from the other one of the main branches 24, and are symmetrical around the main branches 24. The four sub-branches 26 are distanced from the pole 22. The four optical lenses 30 correspond to the four connection portions 28 and the four sub-branches 26. The four optical lenses 30 are connected to the four sub-branches 26 by the four connection portions 28. Each of the four connection portions 28 is perpendicular to a sub-branch 26. In this embodiment, the four connection portions 28 include a first connection portion 282, a second connection portion 284, a third connection portion 286, and a fourth connection portion 288. The four optical lenses 30 include a first optical lens 32, a second optical lens 34, a third optical lens 36, and a fourth optical lens 36.

A rectangular spatial coordinate system is provided in the original product 200. In detail, the center of the bottom of the pole 22 serves as an origin O of the coordinate system. A Z coordinate axis of the coordinate system passes through the origin O and extends vertically (as delineated in FIG. 1) from the pole 22. An X coordinate axis of the coordinate system passes through the origin O and is perpendicular to the Z coordinate axis, and extends along the longitudinal direction of the main branch 24. A Y coordinate axis of the coordinate system passes through the origin O and is perpendicular to the X coordinate axis and to the Y coordinate axis. The first optical lens 32 and the second optical lens 34 are symmetrical about the X coordinate axis. The third optical lens 36 and the fourth optical lens 38 are symmetrical about the X coordinate axis. The first optical lens 32 and the third optical lens 36 are symmetrical about the Y coordinate axis. The second optical lens 34 and the fourth optical lens 38 are also symmetrical about the Y coordinate axis. In other words, the first optical lens 32 and the second optical lens 34 are arranged in a first straight line parallel to the Y coordinate axis. The third optical lens 36 and the fourth optical lens 38 are arranged in a second straight line which is also parallel to the Y coordinate axis. The first optical lens 32 and the third optical lens 36 are arranged in a third straight line parallel to the X coordinate axis. The second optical lens 34 and the fourth optical lens 38 are arranged in a fourth straight line which is also parallel to the X coordinate axis.

The laser cutting device 10 includes a laser device 12, a first rotatable reflecting mirror 14, a second rotatable reflecting mirror 16, a third rotatable reflecting mirror 17, and a fourth rotatable reflecting mirror 18.

The laser device 12 emits laser beams. The laser device 12 can move along the Z coordinate axis (a first direction), and can move along the Y coordinate axis (a second direction), and can move along the X coordinate axis (a third direction). In this embodiment, the laser device 12 is an ultraviolet laser device.

The four rotatable reflecting mirrors 14, 16, 17, and 18 are positioned above the original product 200 and correspond to the four connection portions 282, 284, 286, and 288. In detail, the first rotatable reflecting mirror 14 is aligned with the first connection portion 282. The second rotatable reflecting mirror 16 is aligned with the second connection portion 284. The third rotatable reflecting mirror 17 is aligned with the third connection portion 286. The fourth rotatable reflecting mirror 18 is aligned with the fourth connection portion 288. In this embodiment, the first rotatable reflecting mirror 14 and the second rotatable reflecting mirror 16 are arranged in a fifth straight line which is parallel to the Y coordinate axis. The third rotatable reflecting mirror 17 and the fourth rotatable reflecting mirror 18 are arranged in a sixth straight line which is parallel to the Y coordinate axis. The first rotatable reflecting mirror 12 and the third rotatable reflecting mirror 17 are arranged in a seventh straight line which is parallel to the X coordinate axis. The second rotatable reflecting mirror 16 and the fourth rotatable reflecting mirror 18 are arranged in an eighth straight line which is parallel to the X coordinate axis. The four rotatable reflecting mirrors 14, 16, 17, and 18 can be rotated by a driving unit (not shown), such that the four rotatable reflecting mirrors 14, 16, 17, and 18 can reflect laser beams from the laser device 12 toward the four connection portions 282, 284, 286, and 288 to separate the four optical lenses 32, 34, 36, and 38 from the stub bar 20, and can be rotated out of the path of the laser beams.

Figure 2:
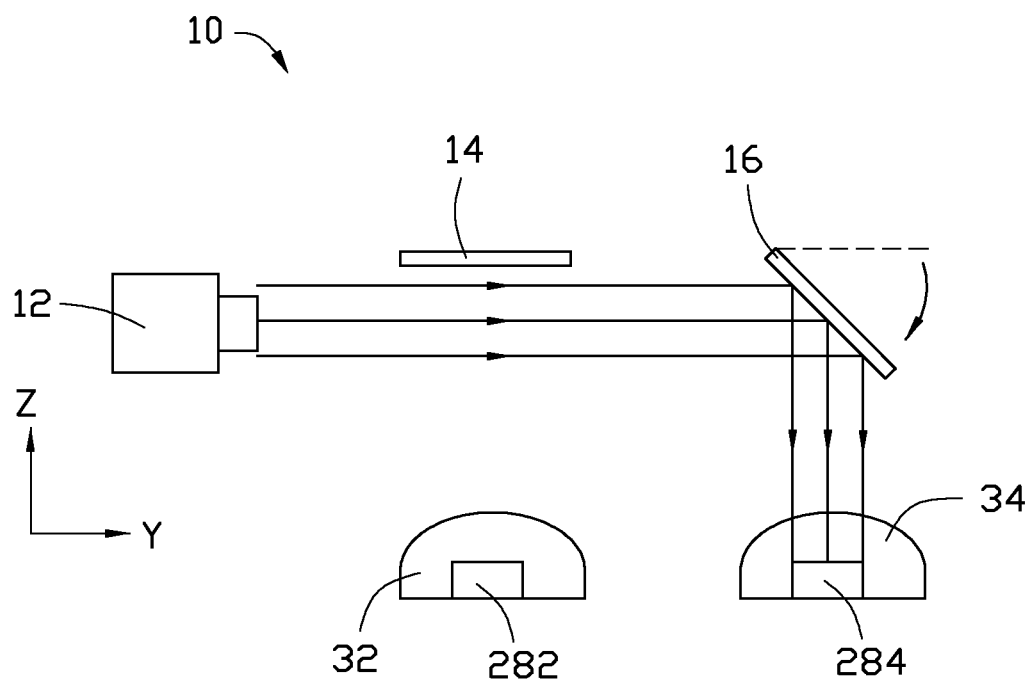
FIG. 2 is a schematic view showing the laser cutting device cutting an original product.

In an initial position, the laser device 12 is located on the fifth straight line, and the first rotatable reflecting mirror 14 and the second rotatable reflecting mirror 16 both face the laser device 12. Referring to FIG. 2, when the laser device 12 is used to cut the original product 200, first, the laser device 12 emits laser beams toward the first rotatable reflecting mirror 14. The first rotatable reflecting mirror 14 reflects the laser beams toward the first connection portion 282 to burn away the first connection portion 282. Second, the laser device 12 moves along the Z coordinate axis until the first connection portion 282 is cut off by the laser beams. Third, the first rotatable reflecting mirror 14 is rotated to allow the laser beams to reach the second rotatable reflecting mirror 16. The second rotatable reflecting mirror 16 reflects the laser beams toward the second connection portion 284 to burn away the second connection portion 284. Fourth, the laser device 12 moves along the Z coordinate axis until the second connection portion 284 is cut off by the laser beams. Fifth, the laser device 12 moves along the X coordinate axis until the laser device 12 is located on the sixth straight line and is aligned with the third rotatable reflecting mirror 17 and the fourth rotatable reflecting mirror 18. Sixth, the laser device 12 emits laser beams toward the third rotatable reflecting mirror 17. The third rotatable reflecting mirror 17 reflects the laser beams toward the third connection portion 286 to burn away the third connection portion 286. Seventh, the laser device 12 moves up and down along the Z coordinate axis until the third connection portion 286 is cut off by the laser beams. Eighth, the third rotatable reflecting mirror 17 is rotated to allow the laser beams to reach the fourth rotatable reflecting mirror 18. The fourth rotatable reflecting mirror 18 reflects the laser beams toward the fourth connection portion 288 to burn away the fourth connection portion 288. Ninth, the laser device 12 moves along the Z coordinate axis until the fourth connection portion 288 is cut off by the laser beams. Thereby, the four optical lenses 32, 34, 36, and 38 are cleanly separated from the stub bar 20.

The laser device 12 may be stationary for the fifth step if the original product 200 is rotated until the first rotatable reflecting mirror 14 is aligned with the fourth connection portion 288 and the second rotatable reflecting mirror 16 is aligned with the third connection portion 286. Then, the four steps (from the first step to the fourth step) are carried out in sequence once again such that the fourth connection portion 288 and the third connection portion 286 are cut off. In this way also, the four optical lenses 32, 34, 36, and 38 are separated from the stub bar 20.

Figure 3:
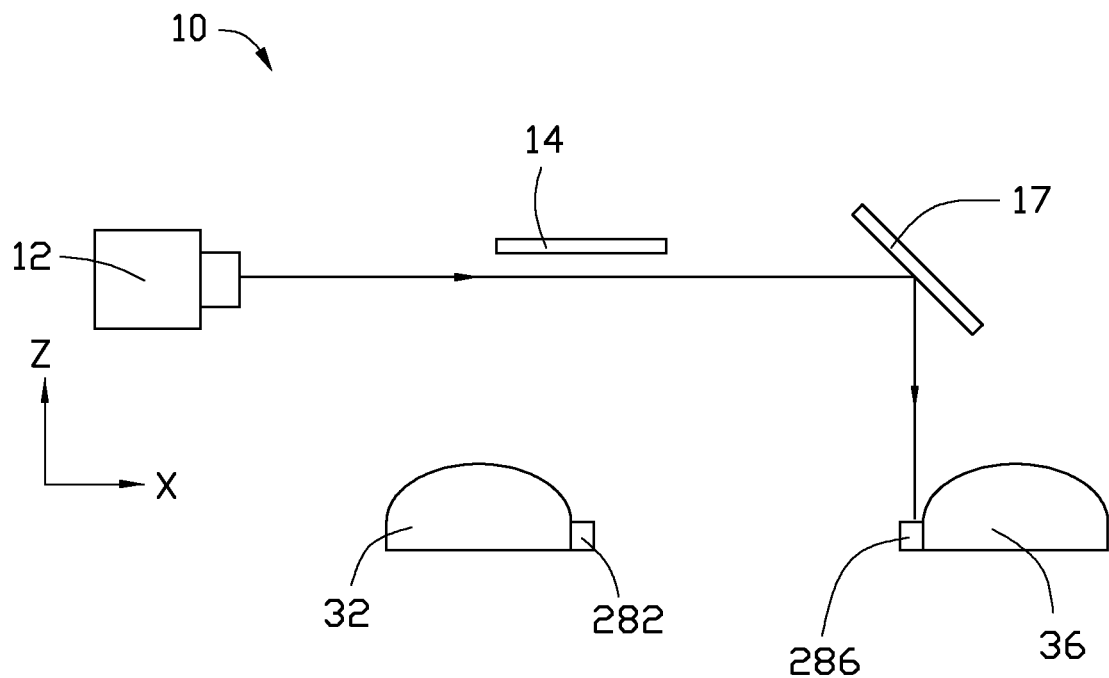
FIG. 3 is similar to FIG. 2, but viewed from another angle.

In other embodiments, in an initial position, the laser device 12 is located on the seventh straight line, and the first rotatable reflecting mirror 14 and the third rotatable reflecting mirror 17 both face the laser device 12. Referring to FIGS. 1 and 3, when the laser device 12 is used to cut the original product 200, first, the laser device 12 emits laser beams toward the first rotatable reflecting mirror 14. The first rotatable reflecting mirror 14 reflects the laser beams toward the first connection portion 282 to burn away the first connection portion 282. Second, the laser device 12 moves along the Y coordinate axis until the first connection portion 282 is cut off by the laser beams. Third, the first rotatable reflecting mirror 14 is rotated to allow the laser beams to reach the third rotatable reflecting mirror 17. The third rotatable reflecting mirror 17 reflects the laser beams toward the third connection portion 286 to burn away the third connection portion 286. Fourth, the laser device 12 moves along the Y coordinate axis until the third connection portion 286 is cut off by the laser beams. Fifth, the laser device 12 moves right along the coordinate axis until the laser device 12 is located on the eight straight line and is aligned with the second rotatable reflecting mirror 16 and the fourth rotatable reflecting mirror 18. Sixth, the laser device 12 emits laser beams toward the second rotatable reflecting mirror 16. The second rotatable reflecting mirror 16 reflects the laser beams toward the second connection portion 284 to burn away the second connection portion 284. Seventh, the laser device 12 moves along the Y coordinate axis until the second connection portion 284 is cut off by the laser beams. Eighth, the second rotatable reflecting mirror 16 is rotated to allow the laser beams to reach the fourth rotatable reflecting mirror 18. The fourth rotatable reflecting mirror 18 reflects the laser beams toward the fourth connection portion 288 to burn away the fourth connection portion 288. Ninth, the laser device 12 moves along the Y coordinate axis until the fourth connection portion 288 is cut off by the laser beams. Thereby, the four optical lenses 32, 34, 36, and 38 are separated from the stub bar 20.

During the-above described cutting process, the original product 200 is cut by laser beams instead of by a traditional cutter, such as a trimming pliers or a scissor. No burring is created even after long usage by the laser device 12, and there is no cracking of material because there is no internal stress.

In this embodiment, the original product 200 is formed by a mode having four cavities. In other embodiments, the laser cutting device 10 can cut an original product which is formed by a mode having two cavities, by a mode having six cavities, or by a mode having eight cavities. In this situation, the number of the rotatable reflecting mirrors accords with the number of the cavity.

Figure 4:
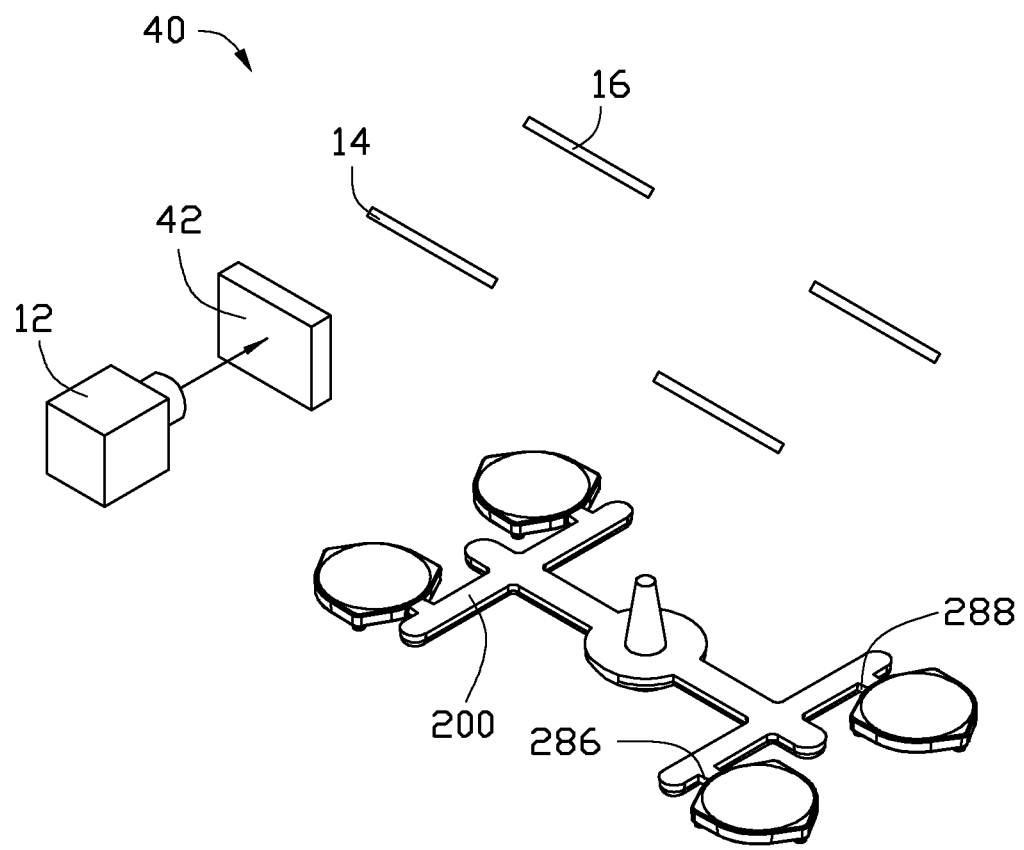
FIG. 4 is a schematic, isometric view of a laser cutting device, according to a second exemplary embodiment.

FIG. 4 shows a laser cutting device 40 according to a second exemplary embodiment. Referring also to FIG. 1, differences between the laser cutting device 40 of this embodiment and the laser cutting device 10 of the first embodiment are that the laser cutting device 40 further includes a photo interrupter 42 which serves as an optical switch. The photo interrupter 42 is positioned between the laser device 12 and the first rotatable reflecting mirror 14. If the photo interrupter 42 is activated, the laser beams is blocked and cannot reach any one of the rotatable reflecting mirrors 14, 16, 17, or 18. If the photo interrupter 42 is not yet activated, the laser beams can pass the photo interrupter 42 and reach a rotatable reflecting mirror 14, 16, 17, or 18. During the cutting process, when the original product 200 is rotated to make the first rotatable reflecting mirror 14 align with the fourth connection portion 288, and to make the second rotatable reflecting mirror 16 align with the third connection portion 286, the emission of laser beams is constant as the photo interrupter 42 is activated to block the laser beams. This avoids the laser device 12 being turned off and on too often. Therefore the life span of the laser device 12 is increased.

Advantages of laser cutting device 40 of the second embodiment are similar to those of the laser cutting device 10 of the first embodiment.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A laser cutting device configured for cutting optical lenses of an original product on different straight lines, the original product comprising a stub bar, a plurality of the optical lenses, and a plurality of connection portions corresponding to the optical lenses, the laser cutting device comprising a laser device which is movable along a first direction and a second direction perpendicular to the first direction, and a plurality of rotatable reflecting mirrors corresponding to the connection portions, the rotatable reflecting mirrors positioned above the original product and aligned with the connection portions, at least two of the plurality of rotatable reflecting mirrors arranged in a first straight line, at least another two of the plurality of rotatable reflecting mirrors arranged in a second straight line which is spaced from the first straight line, the laser device being transitionably located on the first straight line and the second straight line and configured for emitting laser beams, each of the rotatable reflecting mirrors configured for reflecting laser beams from the laser device toward the corresponding connection portion and configured for rotating so as to allow the laser beams from the laser device to reach the next rotatable reflecting mirror on the first straight line or the second straight line.

2. The laser cutting device of claim 1, wherein the laser device is an ultraviolet laser device.

3. The laser cutting device of claim 1, further comprising a photo interrupter located between the laser device and the original product, wherein if the photo interrupter is activated, the photo interrupt is configured for blocking laser beams from the laser device to pass through thereof, and if the photo interrupter is deactivated, the photo interrupter is configured for allowing laser beams from the laser device to pass through thereof.

4. A laser cutting method configured for cutting an original product, the original product comprising a stub bar, a plurality of optical lenses, and a plurality of connection portions corresponding to the optical lenses, the laser cutting method comprising:

provi ding a laser cutting device, the laser cutting device comprising a laser device which is movable along a first direction and a second direction perpendicular to the first direction, and a plurality of rotatable reflecting mirrors corresponding to the connection portions, the rotatable reflecting mirrors positioned above the original product and aligned with the connection portions, at least two rotatable reflecting mirrors arranged in a straight line, the laser device located on the straight line and configured for emitting laser beams, each of the rotatable reflecting mirrors configured for reflecting laser beams from the laser device toward the corresponding connection portion and configured for rotating so as to allow the laser beams from the laser device to reach the next rotatable reflecting mirror on the straight line;

emitting laser beams toward the first rotatable reflecting mirror on the straight line;

moving the laser device along the first direction or the second direction until the connection portion corresponding to the first rotatable reflecting mirror on the straight line is cut off;

rotating the first rotatable reflecting mirror on the straight line to allow the laser beams to reach the next rotatable reflecting mirror on the straight line; and moving the laser device along the first direction or the second direction until the connection portion corresponding to the next rotatable reflecting mirror on the straight line is cut off.

5. The laser cutting method of claim 4, wherein the laser device is an ultraviolet laser device.

6. The laser cutting method of claim 4, wherein the laser cutting device further comprises a photo interrupter located between the laser device and the original product, if the photo interrupter is activated, the photo interrupter is configured for blocking laser beams from the laser device to pass through thereof, and if the photo interrupt is deactivated, the photo interrupt is configured for allowing laser beams from the laser device to pass through thereof.

* * * * *